United States Patent [19]

Kamiyama

[11] Patent Number: 6,084,836
[45] Date of Patent: Jul. 4, 2000

[54] DEFECT DETECTION APPARATUS FOR DETECTING DEFECTS ON A RECORDING MEDIUM AND READING APPARATUS INCORPORATING THE DEFECT DETECTION SYSTEM

[75] Inventor: Hideyo Kamiyama, Tokorozawa, Japan

[73] Assignee: Pioneer Electronic Corporation, Tokyo, Japan

[21] Appl. No.: 09/095,421

[22] Filed: Jun. 11, 1998

[30] Foreign Application Priority Data

Jun. 12, 1997 [JP] Japan .................................. 9-154758

[51] Int. Cl.[7] ...................................................... G11B 7/00
[52] U.S. Cl. .................... 369/44.41; 369/58; 369/124.14
[58] Field of Search ............................... 369/44.25, 44.26, 369/44.32, 44.41, 47, 48, 53, 54, 58, 124.01, 124.14, 59

[56] References Cited

U.S. PATENT DOCUMENTS 5,088,080  2/1992  Ishibashi et al. ..................... 369/59 X
5,204,848  4/1993  Cardero et al. ....................... 369/59 X
5,777,967  7/1998  Ishibashi et al. ..................... 369/54 X Primary Examiner—Paul W. Huber
Attorney, Agent, or Firm—Sughrue, Mion, Zinn, Macpeak & Seas, PLLC

[57] ABSTRACT

A defect detection apparatus has a simple constitution and performs accurate defect detection while clearly differentiating between defect detection and tracking error detection. The defect detection apparatus includes a photodetector having a light-receiving area for receiving a return light beam from a recording medium irradiated with a light beam. A defect on the recording medium is detected based on an output from the photodetector. The defect detection apparatus according to the present invention comprises signal generation means for generating on the basis of an output from the photodetector at least two phase detection signals having phases which vary in a manner complementary to each other according to a deviation of the light beam from a track of the recording medium, adding means for adding up absolute value of the phase detection signal to generate a sum total signal having a value corresponding to a result of the addition, and discrimination means for comparing the value of the sum total signal with a predetermined reference value so as to generate a defect detection signal based on a result of the comparison.

7 Claims, 7 Drawing Sheets

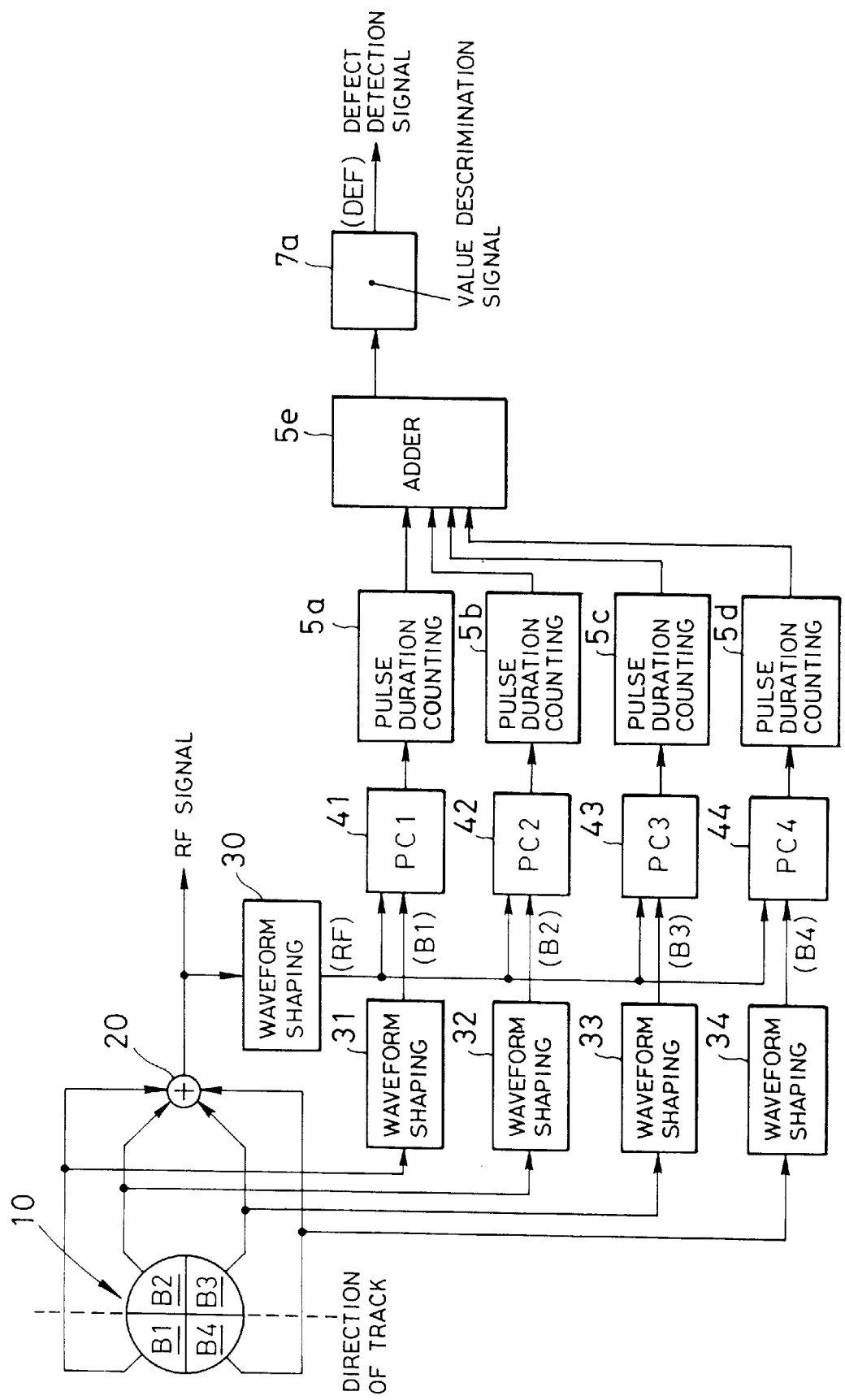

DEFECT DETECTION APPARATUS FOR DETECTING DEFECTS ON A RECORDING MEDIUM AND READING APPARATUS INCORPORATING THE DEFECT DETECTION SYSTEM

BACKGROUND OF THE INVENTION

1. Field of the Invention

This invention relates to a system for detecting defects on an optical information recording medium, and more particularly, to a system of this kind which detects a defect on a recording surface of a recording medium by the use of a photoelectrically converted signal supplied by a quadrant-separated type light detecting element which receives return light beams obtained by irradiating the recording surface with a single reading light beam.

2. Description of the Related Background Art

In recent years, the DVD (digital video disk) system has been put to practical use and is coming into wide use. In carrying out tracking control of the DVD and other high-density information recording media, the main method is to detect a tracking error by using a single reading light beam (and return light beam(s) thereof).

In particular, a method of this kind is based on a tracking error detection technique called the phase difference-based detection method. Various forms of the above methods are employed.

Japanese patent kokai No. 4-10230 and Japanese patent publication Nos. 7-11867 and 8-34007 discloses tracking error detection methods based on the phase difference-based detection method.

However, one of disadvantages with the methods using a single reading light beam for detecting a tracking error is that the light beam is very sensitive to a defect on not only a surface or recording surface of a recording medium but also a defect on a surface of an inner layer as well as an improperly formed mark equivalent to such defects. Such defects are likely to cause degraded playability. In one of the phase difference-based detection methods, a photodetector is used which has four light-receiving surfaces (quadrant surfaces) divided by two dividing lines. It is noted that one dividing line extends in a direction along a track of an objective recording medium and that the other dividing line orthogonal to the one dividing line. The return light beams reflected from the recording medium and incident on the respective light-receiving surfaces are photoelectrically converted to generate respective electric signals. Then, a reference signal is obtained by adding up all the four electric signals to obtain one signal (called an "RF signal", an "HF signal", or a "sum total signal"). Each pair of signals supplied from two light-receiving surfaces symmetrical with respect to the point of intersection of the two dividing lines are added up to obtain a so-called diagonal sum signal, and the phases of the diagonal sum signals are detected with reference to the reference signal. Therefore, a tracking error signal is detected based on the detected phases of the diagonal sum signals.

In the phase difference-based detection method described above, if the reading light beam passes through a defect or scratch, any changes occur in the RF signal and the diagonal sum signals. Accordingly, a reading signal to be demodulated as an information signal is mixed with noises, and moreover, proper execution of tracking servo control is hindered due to absence of a correct tracking error signal, which results in degradation of playability. In such a case, however, if the defect is detected from the return light beams (i.e. electric signals generated from the received return light beams), it will be possible to recognize an occurrence of the noise in the reading signal and generation of an incorrect tracking error signal at the same time. Therefore, degradation of playability can be avoided by inhibiting reproduction of information and execution of tracking servo control based on the respective reading signal and incorrect tracking error signal generated in response to the defect. Therefore, accurate detection of a defect on a recording medium is crucial to a system which employs the method using a single reading light beam for tracking error detection.

On the other hand, when the reading light beam scans a track of the recording medium in a so-called off-track (or detrack) state, the states of the RF signal and the diagonal sum signals change similarly to the above case of the reading light beam passing through a defect. However, a tracking error signal generated in a pure off-track state of the reading light beam is correct, so that changes in the states of the RF signal and the diagonal sum signals are properly produced in dependence on the amount and polarity of the tracking error. Therefore, when defect detection is performed based on the output signals generated from received return light beams, i.e. the RF signal and the diagonal sum signals, it is required to clearly distinguish the detection of a defect from the detection of a tracking error.

Moreover, among defects which a recording medium may have thereon is a defect referred to as a "mirror pinhole", and it is required that such a defect be detected reliably.

SUMMARY OF THE INVENTION

The invention has been made in view of the above problems, and an object of the invention is to provide a defect detection apparatus having a simple constitution which is capable of performing accurate defect detection while clearly differentiating between defect detection and tracking error detection as well as a reading apparatus incorporating the detection system.

To attain the above object, according to a first aspect of the invention, there is provided a defect detection apparatus including a photodetector having a light-receiving area for receiving a return light beam from a recording medium irradiated with a light beam, the defect detection apparatus detecting a defect on the recording medium based on an output from the photodetector, the defect detection system comprising signal generation means for generating on the basis of an output from the photodetector at least two phase detection signals having phases which vary in a manner complementary to each other according to a deviation of the light beam from a track of the recording medium, adding means for adding up an absolute value of the phase detection signals to generate a total signal having a value corresponding to a result of the addition, and discrimination means for comparing the value of the total signal with a predetermined reference value to generate a defect detection signal based on a result of the comparison.

Preferably, the photodetector has two pairs of light-receiving surfaces in the light-receiving area for performing photoelectric conversion independently of one another, the light-receiving surface being arranged at respective point-symmetrical locations, and the signal generation means comprises means for generating a sum total light detection signal corresponding to a sum of levels of photoelectric conversion by the light-receiving surfaces, and individual light detection signals each corresponding to a level of photoelectric conversion by a corresponding one of the light-receiving surfaces, and phase comparison means for performing a phase comparison between the sum total light detection signal and each of the individual light detection signals to generate a phase comparison output signal indicative of a phase difference between the sum total light detection signal and the each of the individual light detection signals, as the phase detection signal.

Preferably, the addition means may add up amounts of electric current corresponding respectively to the absolute values of the phases of the phase detection signals.

Alternatively, the addition means adds up time periods corresponding respectively to the absolute values of the phases of the phase detection signals.

To attain the above object, according to a second aspect of the invention, there is provided a reading apparatus for reading a recording medium, comprising a defect detection system including a photodetector having a light-receiving area for receiving return light beams from a recording medium irradiated with a light beam, signal generation means for generating from the output from the photodetector at least two phase detection signals having phases which vary in a manner complementary to each other according to a deviation of the light beam from a track of the recording medium, adding means for adding up absolute values of the phase detection signals to generate a total signal having a value corresponding to a result of the addition, and discrimination means for comparing the value of the total signal with a predetermined reference value to generate a defect detection signal based on a result of the comparison; demodulation means for demodulating an information signal based on the output from the photodetector; and tracking servo means for generating a tracking error signal based on the phase detection signals and controlling displacement of the light beam in a direction orthogonal to a track of the recording medium, based on error signal.

BRIEF DESCRIPTION OF THE DRAWINGS

FIG. 8 is a block diagram showing a defect detection apparatus for a reading apparatus, according to a second embodiment of the present invention.

DETAILED DESCRIPTION OF THE PREFERRED EMBODIMENTS

The invention will now be described in detail with reference to the drawings showing preferred embodiments thereof.

Figure 1:
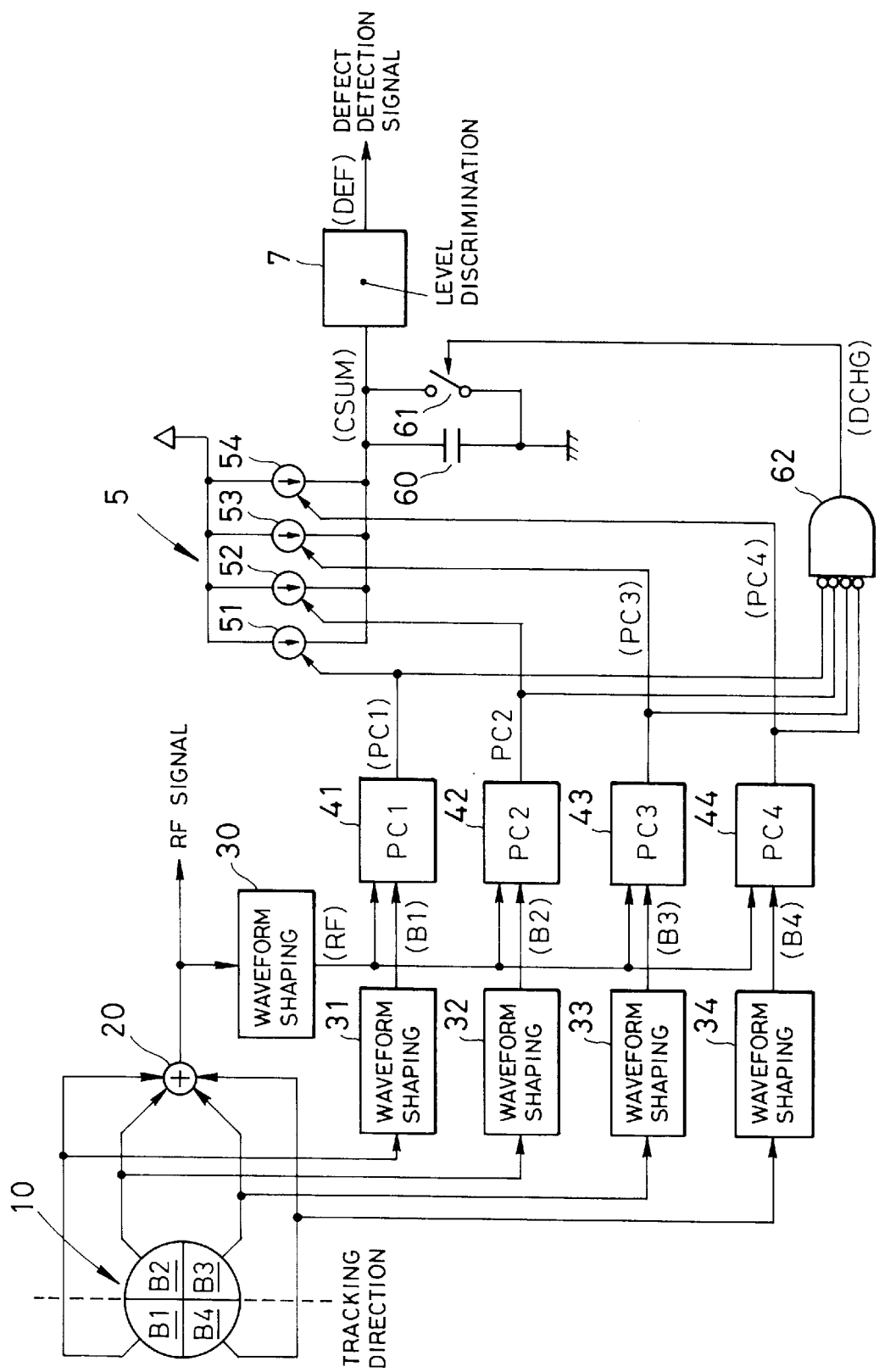
FIG. 1 is a block diagram showing a defect detection apparatus for a reading apparatus according to a first embodiment of the present invention.

Referring first to FIG. 1, there is shown a block diagram of a defect detection apparatus according to a first embodiment which is applied to a DVD (digital video disk) system, such as a DVD player, a DVD drive, or a DVD recorder.

As shown in FIG. 1, the defect detection apparatus comprises a quadrant photodetector 10 including four light-receiving surfaces a B1, B2, B3, and B4, each of which receives a return light beam obtained by irradiating a DVD (not shown) with a single reading light beam. The light-receiving surfaces of the detector 10 are divided into four portions by two linear dividing lines which are orthogonal to each other. Each of the four portions has a uniform shape and a uniform area. One of the dividing lines extends in a direction along a track of the disk. Although, this dividing line is not necessarily precisely parallel to a track of a disk depending on a specific form of an optical system for guiding return light beams onto the light-receiving surfaces, yet the line is required to be arranged such that it is optically substantially parallel to a direction along the track of the disk (in a tangential direction of the track).

The light-receiving surfaces B1, B2, B3, and B4 of the photodetector 10 photoelectrically converts received return light beams into electric signals dependent on the levels and states of the received return light beams to supply the electric signals as light detection signals independently of each other. An adder 20 receives all the four signals supplied from the photodetector 10. The adder 20 then adds up these signals to generate a sum total light detection signal, i.e. an RF signal. The RF signal includes a so-called reading signal, i.e. an objective signal to be demodulated as an information signal in this system. The RF signal is supplied to a demodulation system (not shown), a servo system including a tracking servo (not shown), as well as to a waveform shaping circuit 30. The waveform shaping circuit 30 shapes the RF signal into a rectangular wave with reference to a predetermined threshold value, and then supplies the resulting signal having the shaped waveform to phase comparators 41, 42, 43, and 44. The individual light detection signals which correspond to the respective light-receiving surfaces of the photodetector 10 are also applied respectively to waveform shaping circuits 31, 32, 33, and 34 equivalent to the waveform shaping circuit 30. The waveform shaping circuits 31, 32, 33, and 34 shape these light detection signals into rectangular waves, respectively, with reference to corresponding predetermined threshold values. The waveform shaping circuits 31, 32, 33, and 34 then supply the resulting signals having the shaped waveforms to the phase comparators 41, 42, 43, and 44, respectively.

Each of the phase comparator 41, 42, 43, and 44 compares a corresponding one of the light detection signals with the RF signal and then generates a phase comparison output signal having a pulse duration and a pulse generation timing based on the result of the comparison. Details of a manner of such phase comparison will be described in detail hereinafter.

The phase comparison output signals supplied from these phase comparators are supplied to a group of current sources 5 as current supply means. The group of current sources is comprised of first to fourth current sources 51, 52, 53, and 54. Each of current sources has an upstream terminal connected to a power supply and a downstream terminal connected to a capacitor 60. Further, the first current source 51 has a control terminal supplied with the phase comparison output signal supplied from the phase comparator 41. Similarly, the second to fourth current sources 52, 53, 54 have respective control terminals supplied with the phase comparison output signals supplied from the phase comparators 42, 43 and 44. Accordingly, the amount of current to be supplied by the current sources is controlled in response to a corresponding one of the phase comparison output signals. Therefore, energy of a charge equivalent to the sum of these amounts of electric current is applied to a common node connected the downstream terminals of the four current sources 51, 52, 53, 54.

The capacitor 60 serves as an essential element of electric current addition means. The capacitor 60 has one end connected to one end of an electrical switch 61 and the downstream terminals of the current sources, and the other end grounded. The other end of the switch 61 is also grounded together. The switch 61 has a control terminal supplied with an output signal from an inverted input AND gate 62. The inverted input AND gate 62 inverts each of the four phase comparison output signals supplied from the respective phase comparators 41, 42, 43, and 44. The switch 61 is turned on when the output signal from the gate 62 is at a high level to short-circuit the capacitor 60, so that the capacitor 60 discharges. In contrast, when the output signal from the gate 62 is at a low level, the switch 61 is turned off, so that the electric current supplied from the current sources 51–54 charges the capacitor 60.

The potential of the one end of the capacitor 60, i.e. charging voltage applied thereto is applied to a level discrimination circuit 7. The level discrimination circuit 7 determines whether the charging voltage is higher than a predetermined threshold level. The level discrimination circuit 7 generates a defect detection signal DEF only when the charging voltage is higher than the predetermined threshold level.

Next, the operation of the defect detection system constituted as above will be described.

Figure 2:
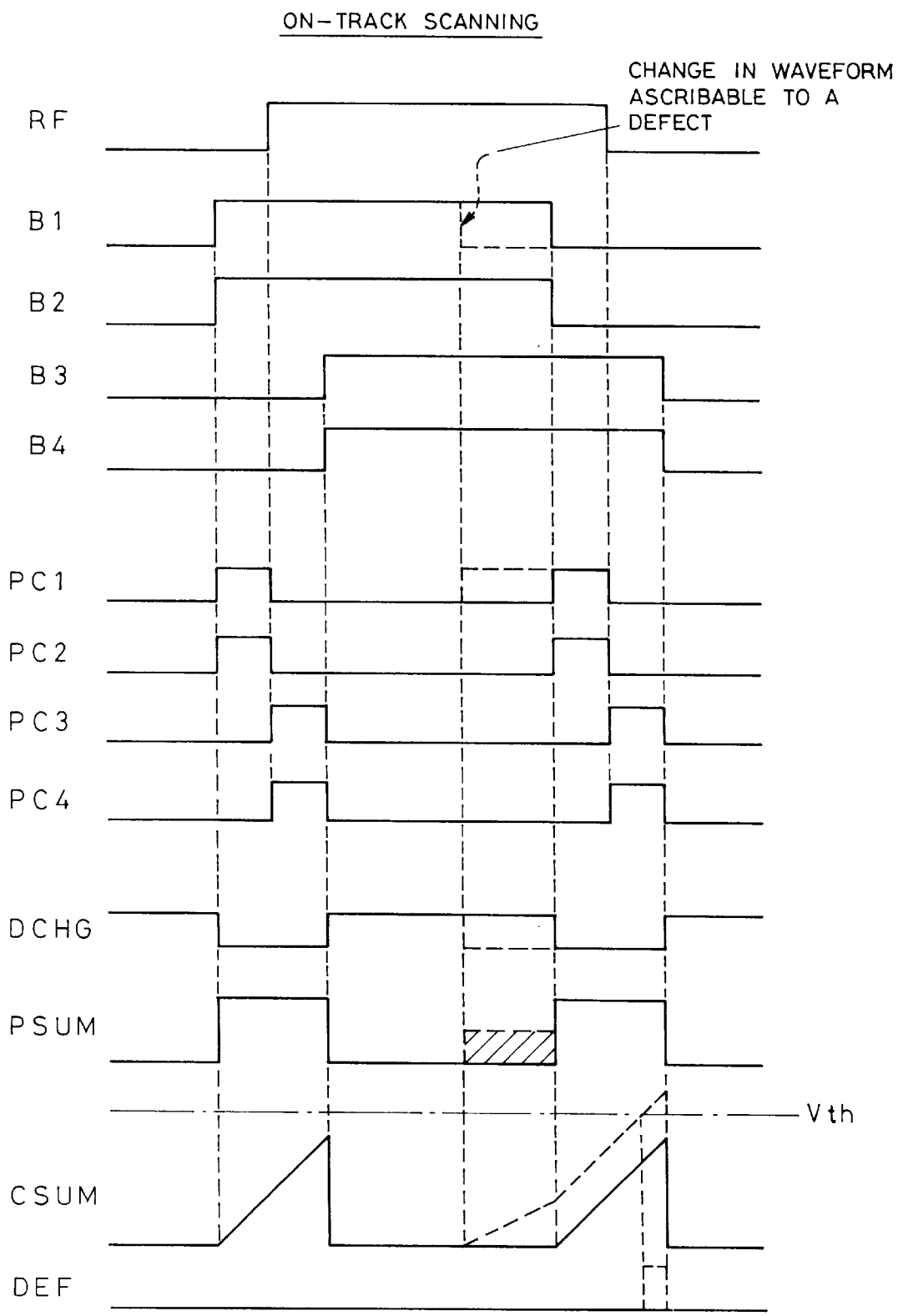
FIG. 2 is a timing chart showing waveforms of signals generated from respective elements and units of the defect detection system in FIG. 1 in on-track scanning of a reading light beam.

FIG. 2 illustrates waveforms of signals supplied from respective elements and circuits of the defect detection apparatus of FIG. 1. The illustrated waveforms correspond a case of on-track scanning, i.e. a case in which the reading light beam scans a center of a track of the disk.

When the reading light beam passes over a pit on the track of the disk, the RF signal supplied from the waveform shaping circuit 30 appears as a rectangular wave which rises substantially when the beam is passing at a forward edge of the pit and then falls substantially at a point when the beam is passing at the backward edge (see FIG. 2). The light detection signals (referred to as a "B1 signal" and a "B2 signal" hereinafter) supplied from the respective waveform shaping circuits 31 and 32 produce rectangular waves which rise up prior to the RF signal and fall down prior to the RF signal (see FIG. 2). The timings of rising and falling for the B1 and B2 signals are prior to the respective timings of the rising and falling for the RF signal by a substantially fixed time period. Therefore, it should be understood that the B1 and B2 signals are each advanced in phase with respect to the rectangular RF signal by a predetermined phase angle.

On the other hand, the light detection signals (referred to as a "B3 signal" and a "B4 signal" hereinafter) supplied from the respective waveform shaping circuits 33 and 34 produce rectangular wave which rise after the RF signal and fall after the RF signal (see FIG. 2). The timings of rising and falling of the B3 and B4 signals are delayed with respect to the respective timings of rising and falling of the RF signal by a substantially fixed time period. Therefore, it should be understood that the B3 and B4 signals each have a phase delayed with respect to the RF signal by a predetermined phase angle.

The phase comparators 41–44 receive the B1 and B4 signals, respectively. Each of the phase comparators 41–44 performs a phase comparison in the following manner. The phase comparator 41 generates a pulse signal PC1 which is held at a higher level over time periods between the rising of the B1 signal and the rising of the rectangular RF signal and between the falling of the B1 signal and the falling of the rectangular RF signal. The pulse signal PCd is held at a lower level anytime except the above-mentioned time periods (see FIG. 2). The phase comparator 42 generates a pulse signal PC2 which is held at a higher level over time periods between the rising of the B2 signal and the rising of the rectangular RF signal and between the falling of the B2 signal and the falling of the rectangular RF signal. The pulse signal PC2 is held at a lower level anytime except the above-mentioned time periods (see FIG. 2). The phase comparator 43 generates a pulse signal PC3 which is held at a higher level over time periods between the rising of the rectangular RF signal and the rising of the B3 signal and between the falling of the rectangular RF signal and the falling of the B3 signal. The pulse signal PC3 is held at a lower level anytime except the above-mentioned time periods (see FIG. 2). The phase comparator 44 generates a pulse signal PC4 which is held at a higher level over time periods between the rising of the rectangular RF signal and the rising of the B4 signal and between the falling of the rectangular RF signal and the falling of the B4 signal. The pulse signal PC4 is held at a lower level anytime except the abovementioned time periods (see FIG. 2).

These output pulse signals PC1–PC4 from the phase comparators 41–44, i.e. phase comparison output signals (hereinafter referred to as a "PC1 signal", a "PC2 signal", a "PC3 signal", and a "PC4 signal") are supplied to the inverted input AND gate 62. The gate 62 generates a pulse signal DCHG which is held at a higher level over a time period during which the PC1 to PC4 signals are held at the lower level. Actually, the gate 62 supplies the pulse signal DCHG during a time period between the falling of the PC4 signal and the rising of the PC1 signal (see FIG. 2). This output signal from the gate 62 (referred to as the "DCHG signal" hereinafter) serves as an ON/OFF control signal supplied to the switch 61. When the level of the signal DCHG is lower, the ON/OFF control signal turns off the switch 61 to bring the capacitor 60 into a chargeable state. On the other hand, when the level of the signal is higher, the ON/OFF control signal turns on the switch 61 to discharge the capacitor 60.

Further, the current sources 51–54 receive the PC1–PC4 signals as respective control signals to independently control the amounts of electric current to be supplied by the current sources. The current source 51 supplies the capacitor 60 with electric current during a time period in which the PC1 signal is held at the higherlevel. The current source 52 supplies the capacitor 60 with electric current during a time period in which the PC2 signal is held at the higher-level. The current source 53 supplies the capacitor 60 with electric current during a time period in which the PC3 signal is at the higher level. The current source 54 supplies the capacitor 60 with electric current during a time period in which in the PC4 signal is at the higher level. Thus, an electric current energy having a waveform indicated by PSUM in FIG. 2 is applied to the capacitor 60. This waveform represents the sum of the higher level of the PC1–PC4 signals obtained by adding up the higher level of the PC1–PC4 signals with respect to both time-axis and level-axis. In other words, the higher level of the electric current energy PSUM shown in the FIG. 2 corresponds to the sum of all the areas defined by the respective higher level of the waveforms of the PC1–PC4 signals.

When the pulses of the PC1–PC4 signals have the higher levels, the DCHG signal is at a lower level. Therefore, the switch 61 is turned off, and the capacitor 60 then enters in a chargeable state. As a result, the electric current energy PSUM generated is applied to the capacitor 60 directly to charge the capacitor 60 proportionally to a peak level of the electric current energy PSUM. A voltage CSUM across the capacitor 60 rises with a slope angle dependent on the level of the electric current energy PSUM. When the level of the DCHG signal becomes higher, the switch 61 is turned on to cause the capacitor 60 to be discharged. The voltage CSUM then falls to a ground level. Thus, the voltage CSUM produces a triangular wave having a pulse peak value corresponding to the electric current energy PSUM supplied to the capacitor 60 in response to the PC1–PC4 signals.

The level discrimination circuit 7 compares the voltage CSUM with a predetermined threshold voltage $V_{th}$ to generate a defect detection signal DEF having a higher level only when the voltage CSUM exceeds the threshold value $V_{th}$. When the center of the reading light beam is scanning the center of the track of the disk as shown in FIG. 2, the voltage CSUM does not exceed the threshold voltage $V_{th}$. Therefore, the defect detection signal DEF remains at a lower level.

The defect detecting operation described above will be described in further detail with reference to FIG. 3.

Figure 3:
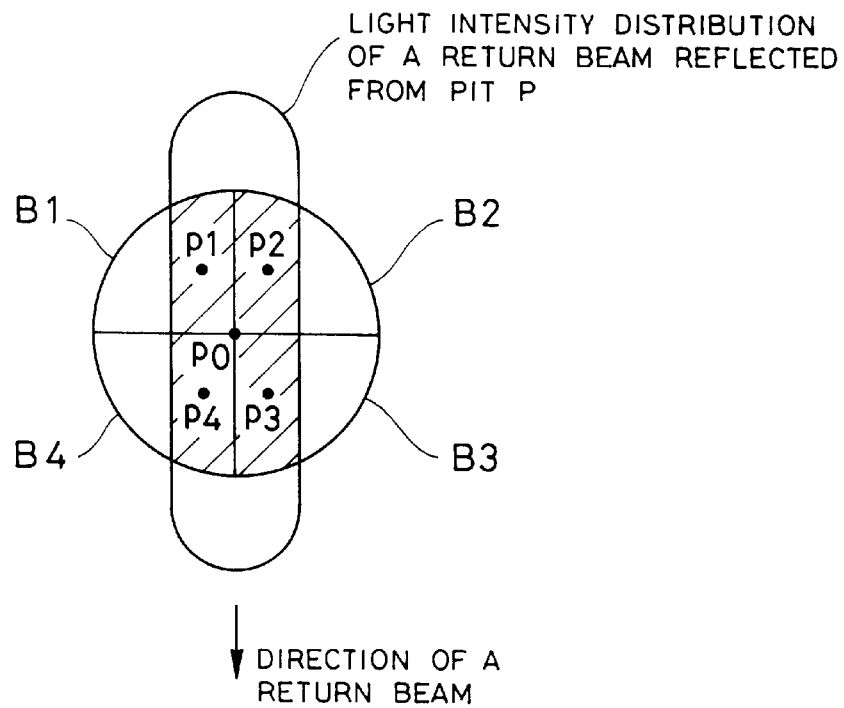
FIG. 3 is a schematic view showing light intensity distributions of a return light beam incident on respective light-receiving surfaces of a photodetector in the on-track scanning of the reading light beam.

FIG. 3 schematically illustrates the relationship between the light-receiving surfaces B1–B4 of the photodetector 10 and light intensity distributions of return light beams incident thereon, when the center of the reading light beam scans the center of a pit of a disk.

Referring to FIG. 3, the centroid of a light intensity distribution on a light-receiving area for generating the RF signal is considered to be located at a point p0 which lies in the center of the light-receiving area, i.e. at the cross section of the two linear dividing lines dividing the photodetector into the light-receiving surfaces B1–B4. Further, Centroids of light intensity distributions on the light-receiving surfaces B1–B4 for generating the B1, B2, B3, and B4 signals are considered to located at points p1–p4, respectively. The points p1 and p3 and the points p2 and p4 are at respective locations symmetrical with respect to the point p0. The four points p1–p4 are equidistant from the point p0. These points appear and disappear in a predetermined time sequence according to the displacement of the pit P with respect to the reading light beam and the photodetector 10. More specifically, first, the centroids associated with the B1 and B2 signals are formed at the points p1 and p2, respectively. Then, the centroid associated with the RF signal is formed at the point p0, and finally, the centroids associated with the B3 and B4 signals are formed at the points p3 and p4, respectively. Further, the centroids associated with the B1 and B2 signals and formed at the points p1 and p2 first disappears. Then, the centroid associated with the RF signal and formed at the point p0 disappears, and finally, the centroids associated with the B3 and B4 signals and formed at the respective points p3 and p4 disappear. Since the B1 and B2 signals are symmetrical with respect to the center line of the pit, the centroids associated with the two signals form themselves and disappear simultaneously. The case is the same with the centroids associated with the B3 and B4 signals.

Therefore, the B1 and B2 signals have an identical advanced phase with respect to the RF signal, while the B3 and B4 signals have an identical delayed phase with respect to the RF signal. This corresponds to the relationship, shown in FIG. 2, between the waveform of the RF signal and those of the B1 and B2 signals and the B3 and B4 signals.

Next, description will be made of the defect detection operation performed when the reading light beam passes exactly through the pit.

Assume that there is a defect on one area of a recording pit which reflects a return light beam to be incident on the light-receiving surface B1, and hence the falling of the B1 signal occurs earlier than that of the normal state of the disk, as shown by a dotted line appearing in FIG. 2. In such a case, a corresponding high-level portion of the PC1 signal is formed to have a longer pulse duration in response to the above change in the B1 signal, as illustrated by the dotted lines in FIG. 2. More specifically, the rise of the PC1 signal pulse is advanced. Further, the lower-level duration of the DCHG signal, i.e. the charge time of the capacitor 60 becomes longer. At the same time, the current amount of the current source 51 is controlled in response to the increased pulse duration of the PC1 signal pulse. The electric current energy PSUM applied to the capacitor 60 is then increased by an increased amount or area represented by a hatched portion appearing in FIG. 2. As a result, the voltage CSUM over the capacitor 60 rises as shown by a dotted sloped line in the FIG. 2, at a rate commensurate with the level of the hatched portion. Even after the hatched portion terminates, i.e. after occurrence of the rising edge of the PC2 signal, the voltage CSUM continues to rise more sharply by the electric current energy PSUM which is the sum of the pulses of the PC1 to PC4 signals.

Thus, the voltage CSUM starts its rise earlier than that of a case in which the disk is normal in response to the PC1 signal having the increased pulse duration. The sum of the electric current energy applied to the capacitor 60 then continues to increase until discharging timing of the capacitor 60, so that the voltage CSUM reaches a more higher pulse level than when the disk is normal without any defect thereon. As a result, the level discrimination circuit 7 determines that the voltage CSUM has exceeded the predetermined threshold voltage $V_{th}$, and continues to generate the defect detection signal at a higher level over a time period during which the voltage CSUM is higher than the threshold voltage $V_{th}$.

Further, when one of the light-receiving surfaces B2–B4 detects a defect or when more than one light-receiving surface detect a defect, similarly to the above case, the chargeable time period becomes longer. At the same time, the sum of the electric current energy applied to the capacitor 60 becomes larger than that of the case in which the disk is normal until the discharging timing, permitting the level discrimination circuit 7 to generate a higher level defect detection signal.

The above description is made of the operation performed when the center of the reading light beam scans the center of the track on the disk, while the following description will be made of an operation performed in off-track scanning, i.e. scanning carried out with the center of the light beam deviated from the center of the track of the disk.

Figure 4:
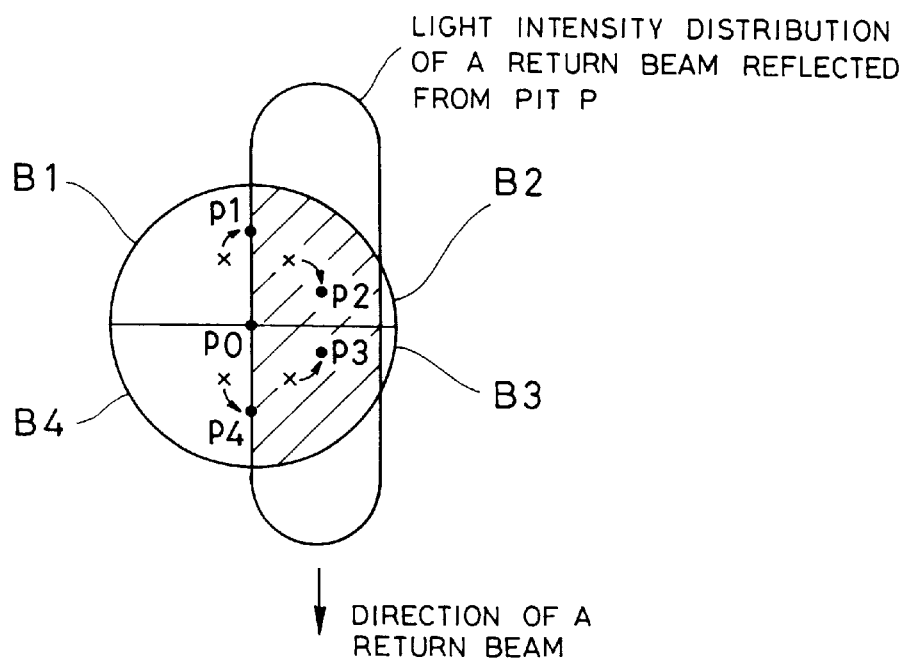
FIG. 4 is a schematic view showing light intensity distributions of a return light beam incident on the respective light-receiving surfaces of the photodetector in off-track scanning of the reading light beam deviated to one side of a track of a disk.

FIG. 4 schematically shows light intensity distributions of return light beams on the light-receiving surfaces B1–B4 of the photodetector 10 when the off-track scanning is performed. In particular, FIG. 4 schematically shows the light intensity distributions when the reading light beam spot scans the pit P in a manner deviated toward either the outer or inner periphery of the disk.

Referring to FIG. 4, there is similar relation to that of the FIG. 3. A centroid of the light intensity distribution on the light-receiving area for generating the RF signal can be considered to be located at the point p0 which lies at the center of the light-receiving area. The point p0 is the intersection of the dividing lines dividing the photodetector into the light-receiving surfaces B1–B4. On the other hand, centroids of the light intensity distributions on the light-receiving surfaces B1–B4 for generating the B1, B2, B3, and B4 signals are no longer symmetrical with respect to the point p0. The centroid p1 associated with the B1 signal is deviated toward the light-receiving surface B2 in a direction opposite to the direction of displacement of the pit P with respect to the reading light beam and the photodetector 10. At the same time, the centroid (p2) associated with the B2 signal is deviated away from the light-receiving surface B1 in the direction of displacement of the pit P with respect to the reading light beam and the photodetector 10. At the same time, the centroid (p3) associated with the B3 signal is deviated away from the light-receiving surface B4 in the direction opposite to the direction of displacement of the pit P with respect to the reading light beam and the photodetector 10. At the same time, the centroid (p4) associated with the B4 signal is deviated toward the light-receiving surface B3 in the direction of displacement of the pit P with respect to the reading light beam and the photodetector 10. These centroids are considered to be deviated to substantially the same degree.

Further, the centroids appear and disappear, one after another, in a predetermined time sequence. That is, first, the centroid associated with the B1 signal is formed at the point p1 by relative displacement of the pit P with respect to the reading light beam and the photodetector 10. Next, the centroid associated with the B2 signal is formed at the point p2. Then, the centroids associated with the RF signal, the B3 signal and the B4 signal are formed at the points p0, p3, and p4, respectively, in the mentioned order. Further, the centroids disappear in the same time sequence after they have appeared.

Figure 5:
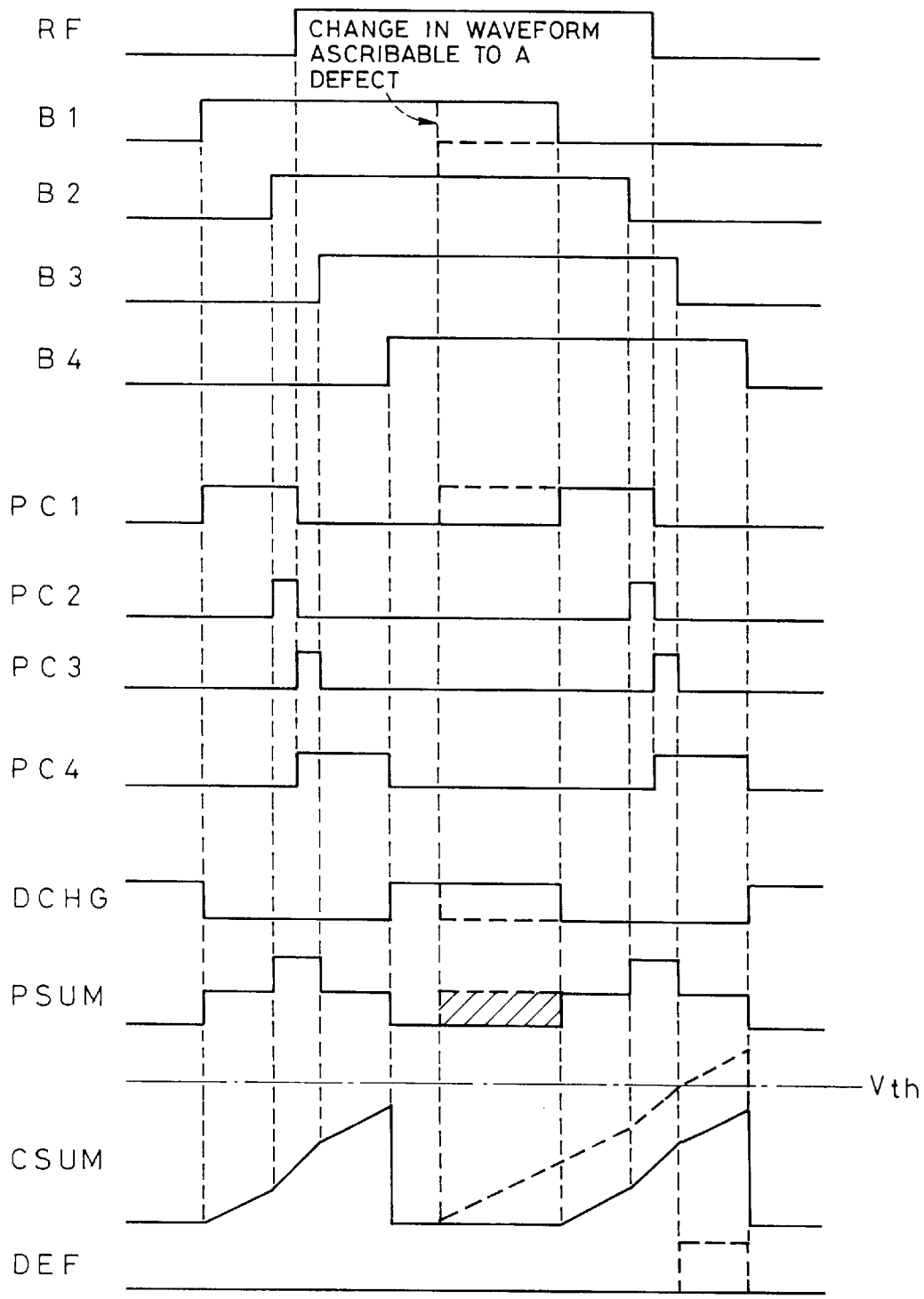
FIG. 5 is a timing chart showing waveforms of the signals and so forth generated from the respective elements and units of the defect detection apparatus in FIG. 1 in the off-track scanning of the reading light beam deviated to the one side of the track of the disk.
Figure 6:
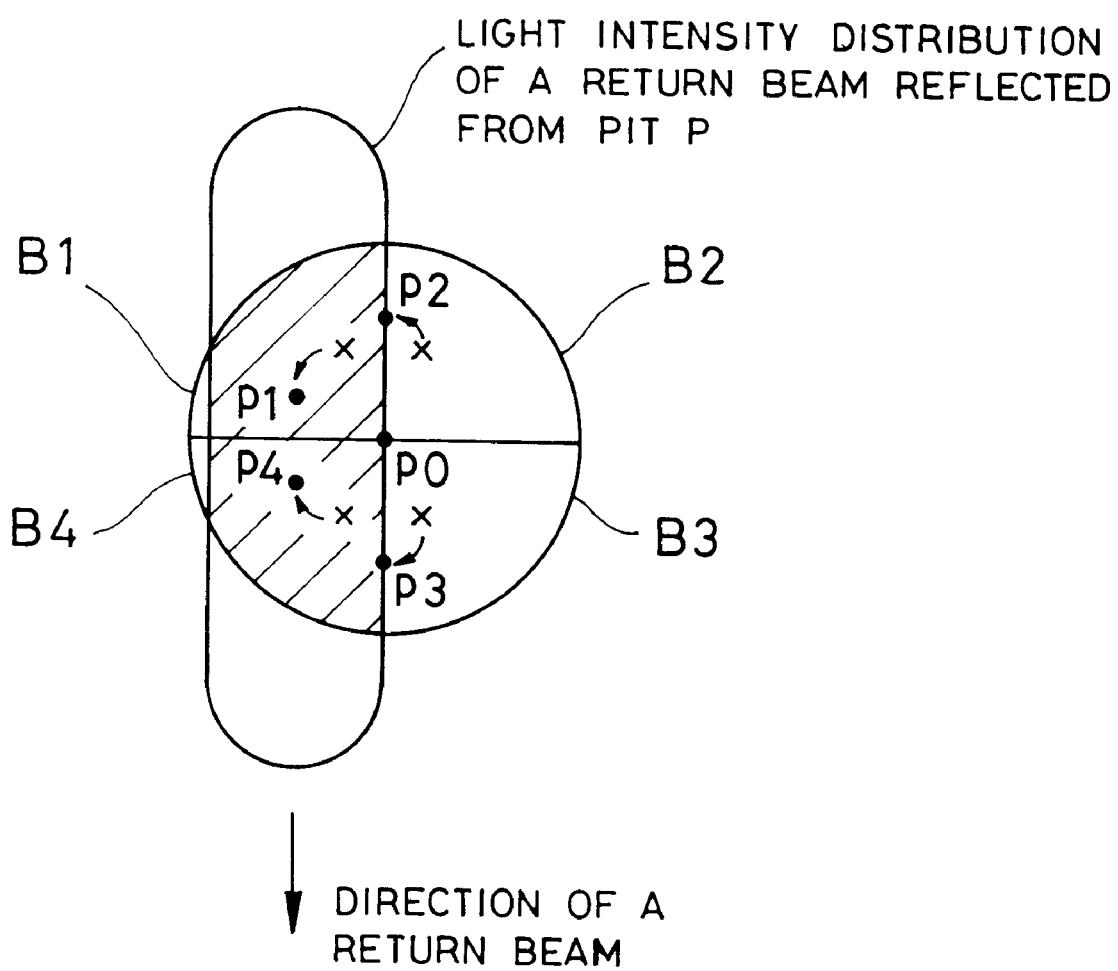
FIG. 6 is a schematic view showing light intensity distributions of a return light beam incident on the respective light-receiving surfaces of the photodetector in off-track scanning of the reading light beam deviated to the other side of the track of the disk.

Accordingly, each of the B1 and B2 signals has an advanced phase with respect to the RF signal, while each of the B3 and B4 signals has a delayed phase with respect to the RF signal. The advance in phase of the B1 signal is larger than that of the B2 signal. The delay in phase of the B3 signal is smaller than that of the B4 signal. Further, it is clear that the absolute value of the advance in phase of the B1 signal is equal to the absolute value of the delay in phase of the B4 signal. Similarly, the absolute value of the advance in phase of the B2 signal is equal to the absolute value of the delay in phase of the B3 signal. FIG. 5 shows waveforms of the respective signals having the relationship described above.

In FIG. 5, the RF signal and the B1–B4 signals have the above relationships between the phases thereof. The other signals and the energy each have a waveform formed based on the relationships.

The most noteworthy is a change in the electric current energy PSUM. Compared with the electric current energy PSUM depicted in FIG. 2, the electric current energy PSUM in FIG. 5 is held at a level above zero over a longer time period. However, a time period in which PSCM is held at the maximum level is shorter. This results from the fact that the PC1 signal has a leading edge advanced and the PC 4 signal has a trailing edge delayed in comparison with those of the PC1 and PC4 signals shown in FIG. 2, while the PC2 signal has a leading edge delayed and the PC3 signal has a trailing edge advanced in comparison with those of the PC2 and PC3 signals shown in FIG. 2.

However, despite the above change in the electric current energy PSUM, the voltage of the capacitor 60 charged by the electric current energy PSUM does not reach the predetermined threshold voltage $V_{th}$. This is because the area defined by a portion of the waveform of the electric current energy PSUM at a level above zero is identical to that of the electric current energy PSUM in the on-track scanning shown in FIG. 2. In other words, in the off-track scanning, while the pulse duration of the PC1 signal and the PC4 signal extend according to the degree of off-tracking. Simultaneously, the pulse duration of the PC2 signal and the PC3 signal decrease to the same extent of the increase in the pulse duration of the PC1 signal and the PC4 signal. Therefore, there occurs no theoretical change in the effective level of the electric current energy PSUM obtained by adding up the pulses of the PC1 to PC4 signals with respect to the time-axis and level-axis.

It should be noted here that in the tracking error detection apparatus (not shown), a tracking error signal can be generated by utilizing the changes occurring in the phases of the PC1 to PC4 signals according to the degree of off-tracking of the reading light beam.

Let it be assumed that in the above off-tracking scanning state, there is a defect e.g. on one portion of a recording pit which reflects a return light beam incident on the light-receiving surface B1, and hence the B1 signal falls down earlier than that of the normal state of the disk, as shown by a dotted line appearing in FIG. 5. In such a case, a corresponding higher level portion of the PC1 signal is formed to have a longer pulse duration in accordance with the above change in the B1 signal, as illustrated by the dotted lines in FIG. 5. More specifically, the rise of the PC1 signal pulse is advanced. Further, the lower level duration of the DCHG signal, i.e. the charge time of the capacitor 60 becomes longer. Simultaneously, the amount of electric current to flow from the current source 51 is controlled in a manner correspondent to the increased pulse duration of the PC1 signal pulse. Therefore, the electric current energy PSUM applied to the one end of the capacitor 60 is increased by an increased amount or area represented by a hatched portion appearing in FIG. 5. As a result, the voltage CSUM of the capacitor 60 rises as shown by a dotted sloped line in the figure, at a rate commensurate with the level of the hatched portion. Even after the hatched portion terminates, the voltage CSUM continues to rise at a slope dependent on the sum of the pulses of the PC1 to PC4 signals.

Thus, in the off-tracking state as well, the voltage CSUM starts its rise earlier than that of the case in which the disk is normal in response to the PC1 signal having the increased pulse duration. The sum of the electric current energy applied to the capacitor 60 then continues to increase until discharging timing of the capacitor 60. Therefore, the voltage CSUM reaches a higher pulse level than that of the case in which the disk is normal without any defect thereon. As a result, the level discrimination circuit 7 is able to determine that the voltage CSUM has exceeded the predetermined threshold voltage $V_{th}$. The level discrimination circuit 7 then continues to output the defect detection signal at a high level over a time period during which the voltage CSUM is higher than the threshold voltage $V_{th}$.

Further, when one or more of the light-receiving surfaces B2–B4 detects a defect, similarly to the above case, the chargeable time period becomes longer. At the same time, the sum of the electric current energy applied to the capacitor 60 becomes larger than that of the case in which the disk is in a normal condition. Accordingly, the level discrimination circuit 7 is able to generate a higher level defect detection signal.

The operation described with reference to FIG. 5 is performed when the reading light beam is deviated from the center of the track on the disk toward one of the outer periphery and the inner periphery of the disk. The following description will be made of an operation performed when the reading light beam is deviated in an opposite direction, i.e. toward the other of the outer periphery and the inner periphery of the disk.

In this case, similarly to the FIG. 3 and FIG. 4 cases, the centroid of the light intensity distribution on the light-receiving area, from which the RF signal is generated, can be considered to be located at the point p0 which lies at the center of the light-receiving area. In other words, the centroid is considered to be at the point of intersection of the dividing lines separating the light-receiving surfaces B1 to B4 from each other. On the other hand, the centroids of the light intensity distributions on the light-receiving surfaces B1–B4, from which the respective B1, B2, B3, and B4 signals are generated, are located at respective locations in the arrangement of the points P1–P4 of FIG. 4 which are exchanged axially symmetrically. The centroid (p1) associated with the B1 signal is deviated apart from the light-receiving surface B2 in the direction of displacement of the reading light beam and the photodetector 10 for the pit P. The centroid (p2) associated with the B2 signal is deviated toward the light-receiving surface B1 in a direction opposite to the direction of displacement of the reading light beam and the photodetector 10 for the pit P. Further, the centroid (p3) associated with the B3 signal is deviated toward the light-receiving surface B4 in the direction of displacement of the reading light beam and the photodetector 10 for the pit R The centroid (p4) associated with the B4 signal is deviated apart from the light-receiving surface B3 in a direction opposite to the direction of displacement of the reading light beam and the photodetector 10 for the pit R These centroids can be considered to be deviated by substantially the same extent.

Further, the centroids appear and disappear one after another in a predetermined time sequence. That is, first, the centroid associated with the B2 signal is formed at the point p2 by relative displacement of the reading light beam and the photodetector 10 with respect to the pit R Next, the centroid associated with the B1 signal is formed at the point p1. Then, the centroids associated with the RF signal, the B4 signal and the B3 signal are formed at the points p0, p4, and p3, respectively, respectively. Further, the centroids disappear in the same order after they have been formed.

Figure 7:
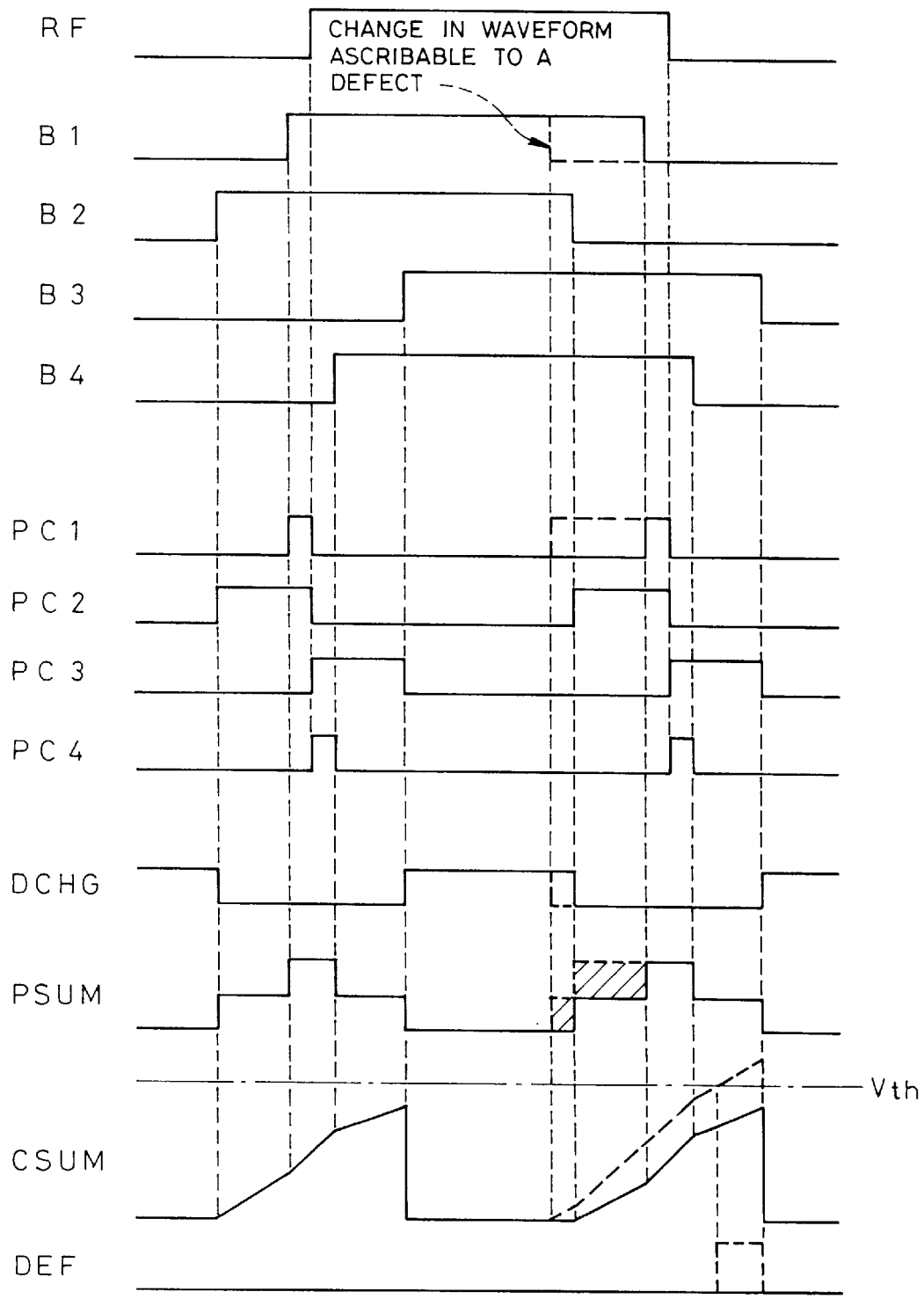
FIG. 7 is a timing chart showing waveforms of the signals and so forth generated from the respective elements and units of the defect detection apparatus in FIG. 1 in the off-track scanning of the reading light beam deviated to the other side of the track of the disk.

Accordingly, each of the B1 and B2 signals has an advanced phase with respect to the RF signal, while each of the B3 and B4 signals has a delayed phase with respect to the RF signal. The advance in phase of the B1 signal is smaller than that of the B2 signal. The delay in phase of the B3 signal is larger than that of the B4 signal. Further, it is noticed that the absolute value of the advance phase of the B1 signal is equal to that of the delay phase of the B4 signal. It is also noticed that the absolute value of the advance phase of the B2 signal is equal to that of the delay phase of the B3 signal. FIG. 7 shows waveforms of the respective signals having the relationship described above.

Referring to FIG. 7, the RF signal and the B1–B4 signals have the above relationships between the phases thereof, and the other signals and the energy each have a waveform formed based on the relationships.

In the FIG. 7 case as well, compared with the electric current energy PSUM depicted in FIG. 2, the electric current energy PSUM is held at a level above zero over a longer time period. However, a time period over which it is held at the maximum level is shorter. This is because not only that the PC1 signal has a leading edge delayed and the PC4 signal has a trailing edge advanced in comparison with those of the PC1 and PC4 signals shown in FIG. 2, but also that the PC2 signal has a leading edge advanced and the PC3 signal has a trailing edge delayed in comparison with those of the PC2 and PC3 signals shown in FIG. 2.

However, similarly to the FIG. 5 case, despite the above change in the manner of change in the electric current energy PSUM, the voltage of the capacitor 60 charged by the electric current energy PSUM does not reach the predetermined threshold voltage $V_{th}$. In this case as well, the area defined by a portion of the waveform of the electric current energy PSUM at a level above zero is identical to that of the electric current energy PSUM in the on-track scanning shown in FIG. 2. The pulse duration of the PC1 signal and the PC4 signal decrease according to the degree of off-tracking, while the pulse duration of the PC2 signal and the PC3 signal increase to the same extent of the decrease in the pulse duration of the PC1 signal and the PC4 signal. Therefore, there occurs no theoretical change in the effective level of the electric current energy PSUM obtained by adding up the pulses of the PC1–PC4 signals with respect to the time-axis and level-axis.

Let it be assumed that in the above off-tracking scanning state, there is a defect similar to that of the above case, and hence the falling of the B1 signal occurs earlier than that of the normal state of the disk, as shown by a dotted line appearing in FIG. 7. In such a case, a corresponding higher level portion of the PC1 signal is formed to have a longer pulse duration in accordance with the above change in the B1 signal, as illustrated by the dotted lines in FIG. 7. Further, the lower level duration of the DCHG signal lengthened according to the lengthened pulse duration of the PC1 signal makes the charge time of the capacitor 60 longer. At the same time, the amount of current to flow from the current source 51 is controlled over a longer time period. Therefore, the electric current energy PSUM applied to the one end of the capacitor 60 is increased by an increased amount or area represented by a hatched portion appearing in FIG. 7. As a result, the voltage CSUM of the capacitor 60 rises as shown by a dotted sloped line in the figure, at a rate commensurate with the level of electric current energy PSUM including the level of the hatched portion.

Thus, in the off-tracking state deviated in the opposite direction as well, in response to the PC1 signal having the increased pulse duration, the voltage CSUM reaches a higher pulse level than that of the case in which the disk is normal without any defect thereon. As a result, the level discrimination circuit 7 determines that the voltage CSUM has exceeded the predetermined threshold voltage $V_{th}$, and continues to output the defect detection signal at a higher level over a time period during which the voltage CSUM is larger than the predetermined threshold voltage $V_{th}$.

In general, when the reading light beam performs scanning in a state deviated from the pit toward the outer or inner periphery of the disk as described above, a tracking error occurs. However, the present embodiment is different from the prior art in which a defect is basically detected based on the pulse duration of the PC1–PC4 signals (or tracking error detection component). In the present embodiment, a defect is detected based on the electric current energy PSUM obtained by once converting the P1 to P4 signals to electric currents. The present invention makes it possible to carry out accurate defect detection without erroneously recognizing existence of a defect as occurrence of a tracking error, and vice versa.

Although in the first embodiment described above, defect detection is performed based on the sum of levels of electric current converted from the PC1 to PC4 signals. It is within the scope of the invention to detect a defect based on the sum of time periods converted from the PC1 through PC4 signals by a defect detection system according to a second embodiment of the invention as described below.

FIG. 8 shows a block diagram of the defect detection apparatus according to the second embodiment of the present invention. Component parts and elements having the same functions as those described of the first embodiment are designated by identical reference numerals.

In FIG. 8, PC1–PC4 signals are supplied from phase comparators 41–44 to corresponding pulse duration timer circuits 5a–5d, respectively. Each of the timer circuits 5a–5d generally includes a counter. Basically, each timer circuit is configured to measure the pulse duration by counting pulses of a clock signal which has a far shorter cycle than the pulse duration of the PC1–PC4 signal pulses during a period in which the PC1–PC4 signal pulses exist whenever it is generated.

The counts of the timer circuits 5a–5d, i.e. timer outputs indicative of respective pulse duration are supplied to an adder 5e to be all added up. Therefore, a sum total signal indicative of the sum of the whole timer output values is supplied from the adder 5e. The adder 5e performs such addition operation as to a series of pulses of the PC1–PC4 signals, i.e. per leading edge and trailing edge of the rectangular-wave RF signal. Therefore, the adder 5e is configured so as to execute the addition operation by the use of a signal such as the DCHG signal when the signal rises to a higher level, and reset an immediately preceding addition result which is stored, when the signal falls to a lower level.

The output signal indicative of the sum from the adder 5e is supplied to a value discrimination circuit 7a for evaluation of the sum. That is, the value discrimination circuit 7a determines whether the value of the sum total signal is larger than a predetermined reference value. If the value of the sum total signal is larger than the predetermined reference value, the value discrimination circuit 7a generates a defect detection signal which has a higher level.

Thus, the present embodiment provides the same effect as obtained by the first embodiment.

Although in the above embodiments, defect detection is performed mainly by means of so-called hardware, it is within the scope of the invention to detect a defect by means of software.

More specifically, the defect detection described above can also be performed by providing an A/D (analog-to-digital) converter at the first stage instead of part of the circuit configuration from the waveform shaping circuits 30 and 31 to 34 to the level discrimination circuit 7 or the value discrimination circuit 7a, to process signals digitized by the converter by the use of a microcomputer. In other words, the defect detection apparatus may comprise phase comparison means constituted by software for phase comparing the RF signal and the light detection signal from each of the light-receiving surfaces to generate phase comparison signals indicative of phase differences between the RF signal and the respective light detection signals. The defect detection apparatus may further comprise addition means constituted by software for adding up absolute values of the respective phase differences indicated by the phase comparison signals so as to generate a sum total signal indicative of a value obtained based on the addition result. The defect detection apparatus may still further comprise discrimination means for comparing the value of the sum total signal with a predetermined reference value and to generate a defect detection signal based on a result of the comparison can be implemented by software.

Further, in the above embodiments of the present invention, the PC1 to PC4 signals are generated based on the phase comparisons between the RF signal and the B1 to B4 signals. At least two phase detection signals then have phases which change in a manner complementary to each other according to the deviation of the beam from the track on the information recording medium in response to the PC1 to PC4 signals. However, it is obvious from the above-mentioned known publications that these phase detection signals (i.e. phase detection signals obtained based on the so-called phase difference-based detection method) can be generated without using the RF signal, and there is possibility of some other different processes being employed for generating the phase detection signal.

Further, in the above embodiments, description is made of cases in which the present invention is applied to defect detection performed for a DVD (digital video disk). But it is also within the scope of the invention to defect detection for other types of information recording media such as a CD (compact disk) and a LD (laser disk).

It is further understood by those skilled in the art that the foregoing is preferred embodiments of the invention, and that various changes and modifications may be made without departing from the sprit and scope thereof.

As described above in detail, the present invention makes it possible to perform accurate defect detection by an apparatus having a simple construction, without any confusion between generation of a defect and occurrence of a tracking error.

What is claimed is:

1. A defect detection apparatus including a photodetector having a light-receiving area for receiving a return light beam from a recording medium irradiated with a light beam, said defect detection apparatus for detecting a defect on said recording medium based on an output from said photodetector, said defect detection apparatus comprising:

signal generation means for generating from an output of said photodetector at least two phase detection signals having phases which vary in a manner complementary to each other according to a deviation of said light beam from a track of said recording medium;

adding means for adding up absolute values of said phase detection signals to generate a total signal having a value corresponding to a result of said addition; and discrimination means for comparing a value of said total signal with a predetermined reference value to generate a defect detection signal based on a result of said comparison.

2. The defect detection apparatus according to claim 1, wherein said adding means adds up amounts of electric current corresponding to an absolute value of a phase of said phase detection signal.

3. The defect detection apparatus according to claim 1, wherein said adding means adds up time periods corresponding to the absolute value of the phase of said phase detection signal.

4. The defect detection apparatus according to claim 1, wherein said photodetector has two pairs of light-receiving surfaces in said light-receiving area for performing photoelectric conversion independently of one another, said light-receiving surface being arranged at respective point-symmetrical locations, and wherein said signal generation means comprises means for generating a sum total light detection signal and a light detection signal, said sum total light detection signal corresponding to a sum of levels of photoelectric conversion by said light-receiving surfaces, said light detection signal corresponding to a level of photoelectric conversion by the corresponding light-receiving surfaces, and phase comparison means for phase-comparing said sum total light detection signal with each of said individual light detection signals to generate a phase comparison output signal indicative of a phase difference between said sum total light detection signal and said each of said individual light detection signals as said phase detection signal.

5. The defect detection apparatus according to claim 4, wherein said adding means adds up amounts of electric current corresponding to an absolute value of a phase of said phase detection signal.

6. The defect detection apparatus according to claim 4, wherein said adding means adds up time periods corresponding to the absolute value of the phase of said phase detection signal.

7. A reading apparatus for reading a recording medium, comprising:

a defect detection unit including a photodetector having a light-receiving area for receiving a return light beam from a recording medium irradiated with a light beam, signal generation means for generating at least two phase detection signals on the basis of an output from said photodetector, said at least two phase detection signals having phases which vary in a manner complementary to each other according to a deviation of the light beam from a track of said recording medium, adding means for adding up an absolute value of said phase detection signal to generate a sum total signal having a value corresponding to a result of said addition, and discrimination means for comparing a value of said sum total signal with a predetermined reference value to generate a defect detection signal based on a result of said comparison;

demodulating means for demodulating an information signal based on the output from said photodetector; and tracking servo controlling means for generating a tracking error signal based on said phase detection signals and controlling displacement of said light beam in a direction orthogonal to a track of said recording medium based on said tracking error signal.

* * * * *